(12) United States Patent
Blewett et al.

(10) Patent No.: US 7,127,958 B2
(45) Date of Patent: Oct. 31, 2006

(54) DUST TESTING FACILITY FOR MOTOR VEHICLES

(75) Inventors: John J. Blewett, Grand Blanc, MI (US); Christopher D. Lega, Fenton, MI (US)

(73) Assignee: General Motors Corporation, Detroit, MI (US)

( * ) Notice: Subject to any disclaimer, the term of this patent is extended or adjusted under 35 U.S.C. 154(b) by 171 days.

(21) Appl. No.: 10/828,595

(22) Filed: Apr. 21, 2004

(65) Prior Publication Data

US 2005/0235763 A1 Oct. 27, 2005

(51) Int. Cl.
G01N 17/00 (2006.01)
G01M 17/007 (2006.01)

(52) U.S. Cl. .................................. 73/865.6; 73/865.9
(58) Field of Classification Search ............... 73/865.6, 73/865.9, 117.1, 40, 7
See application file for complete search history.

(56) References Cited

U.S. PATENT DOCUMENTS 4,667,522 A * 5/1987 Kawahara .................. 73/865.6
4,799,390 A * 1/1989 Kimura ..................... 73/865.6
5,381,701 A * 1/1995 Frankenthal et al. ....... 73/865.6

FOREIGN PATENT DOCUMENTS

| DE | 10155245 A1 | * | 5/2003 | |
|---|---|---|---|---|
| JP | 57184944 A | * | 11/1982 | ............. 73/865.6 |
| KR | 98047552 A | * | 9/1998 | |
| SU | 1080061 A | * | 3/1984 | |
| SU | 1394088 A | * | 5/1988 | |
| SU | 1479795 A | * | 5/1989 | |
| SU | 1499144 A | * | 8/1989 | |

* cited by examiner

Primary Examiner—Thomas P. Noland
(74) Attorney, Agent, or Firm—Laura C. Hargitt

(57) ABSTRACT

A dust testing facility for static dust testing of a motor vehicle, wherein actual road dust is utilized, which dust is fully recirculated and reused, and wherein the dust testing of the motor vehicle suitably approximates a dynamic road dust test of the motor vehicle. The dust testing facility includes a dust testing chamber which receive thereinside a motor vehicle to be tested and is integrated with four major component systems: an air supply system, a dust supply system, a dust spray system interfaced with the dust supply system, and a dust recapture system interfaced with the air supply and dust supply systems. The dust testing chamber preferably includes, for purposes of dust testing of a motor vehicle, a leak detection system selectively interfaced with a motor vehicle being dust tested.

14 Claims, 5 Drawing Sheets

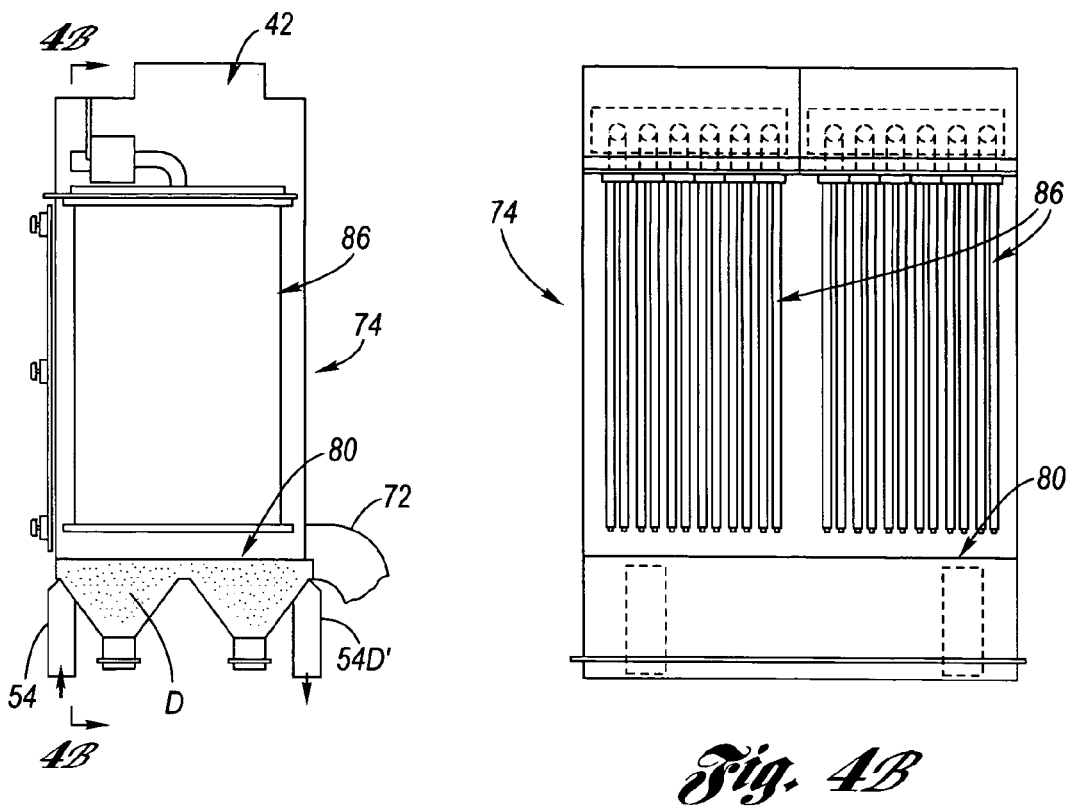
*Fig. 4A*
*Fig. 4B*
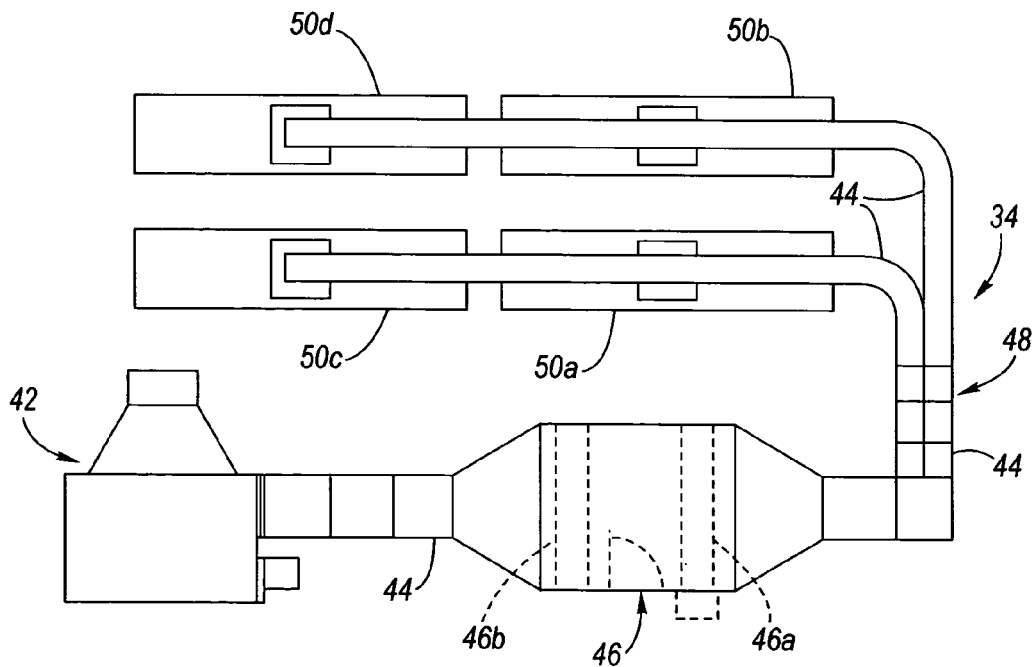
*Fig. 5*

DUST TESTING FACILITY FOR MOTOR VEHICLES

TECHNICAL FIELD

The present invention relates to testing facilities used to test how a motor vehicle is affected by various environmental conditions, and more particularly to a testing facility for testing how dust affects a motor vehicle.

BACKGROUND OF THE INVENTION

Original equipment manufacturers of motor vehicles perform various tests on prototype and production vehicles in order to ascertain their performance characteristics. Some tests involve subjecting the motor vehicle to certain environmental conditions. One of these environmental conditions is dust.

It has been routine practice for dust testing of a motor vehicle to be performed by a dynamic road test in which the subject motor vehicle is driven in the open air over a predetermined road course whereat dust is present, as for example at a dirt road course (public or private) in the desert. Various aspects of the motor vehicle are impacted by dust, as for example the quality of the door sealing.

In the 1970's Fisher Body, a division of General Motors Corporation, Detroit, Mich., experimented with the possible use of a dust testing chamber for motor vehicle dust testing at the General Motors Technical Center in Warren, Mich. However, the tests were inconclusive and the dust could not be recirculated. Accordingly, the dynamic road dust test was considered indispensable for the analysis of motor vehicle sealing and the dust chamber experimentation was abandoned.

Applicants have heard by second-hand information that the U.S. military may have a dust testing booth in Florida, but if it exists, the workings thereof are unknown to Applicants. Applicants are also aware that Boeing Corporation of Seattle, Wash., uses a type of dust booth that involves placing oil on an aircraft wing; the dust, in conjunction with the oil, serves to seal any cracks that my be present on the wing surface.

In the interim since the Fisher Body experimentation, improved air filtration systems have become available. Additionally, dry powder spray systems for paint application have been developed. These developments, combined with the time and money consumed by dynamic road tests, have given new impetus to the need to develop a successful dust testing facility for motor vehicle evaluations.

SUMMARY OF THE INVENTION

The present invention is a dust testing facility for static dust testing of a motor vehicle, wherein actual road dust is utilized, which dust is fully recirculated and reused, and wherein the dust testing of the motor vehicle suitably approximates an outdoor dynamic road dust test of the motor vehicle.

The dust testing facility according to the present invention is an environmentally closed system, wherein a dust testing chamber forms an interior chamber space which receives a motor vehicle to be tested, and wherein the dust testing chamber is integrated with four major component systems: 1) an air supply system, 2) a dust supply system, 3) a dust spray system interfaced with the dust supply system, and 4) a dust recapture system interfaced with the air supply and dust supply systems. The dust testing chamber preferably includes, for purposes of dust testing of a motor vehicle, a leak detection system selectively interfaced with a motor vehicle being dust tested.

In the preferred embodiment of the dust testing facility, the dust testing chamber provides a selectively enclosable space defined by sidewalls, a ceiling, a flooring group, and at least one door, which when closed provides enclosure of the space. The air supply system includes a fan unit, temperature and humidity regulation components preferably in the form of a heating and air conditioning unit and a steam injection unit, and selectively ventable air supply ducts connected therewith to a plurality of air vents (preferably four mutually spaced air vents) located at the ceiling of the dust testing chamber. The dust supply system includes a source of compressed air, an air dryer, road dust, and a supply dust fluidizer for fluidizing the dust. The dust spray system includes a pump for providing a pressurized mixture of compressed air and the dust, dust supply conduits connected to the pump and a plurality of dust spray nozzles (preferably four mutually spaced dust spray nozzles, one dust spray nozzle for each air vent) located at the ceiling of the dust testing chamber. The dust recapture system includes the flooring group being composed of a floor grating elevated with respect to a plenum which is interconnected with return ducts to a return dust collector, including a filter unit interfaced with the air supply system, and a return dust fluidizer, which is, in turn, connected by a dust return conduit to the supply dust fluidizer.

In operation of the dust testing facility, a motor vehicle is parked inside the dust testing chamber and is connected to a leak detection system through a portal in a sidewall of the dust testing chamber. Preferably for example, the leak detector holds the air pressure inside the motor vehicle at about 0.5 inch of water negative pressure (vacuum) with respect to atmospheric, and the selected pressure inside the dust testing chamber is held at about 0.1 inch of water negative pressure (vacuum) with respect to atmospheric. The air supply, dust supply, dust spray and dust return systems are selectively activated and the fluidized dust is allowed to emanate from the dust supply nozzles and commingle with the air flow (as for example at 6,000 cubic feet per minute) from the air vents to provide a copious amount of atomized dust (as for example a selectively processed Arizona road dust) around a motor vehicle parked in the dust chamber. After a predetermined time (as for example 8 minutes, during which a dust cloud has enveloped the vehicle, which cloud may be aided and directed by a plurality of fans within the dust chamber), the dust spray is stopped, but the airflow continues so as to purge the chamber of dust, and all the while recycling the dust for the next motor vehicle evaluation. The motor vehicle is then disconnected from the leak detection system, and removed for dust evaluation.

As can be understood from the foregoing, the dust testing facility according to the present invention has the advantage of providing motor vehicle dust testing to be conducted year round and independent of external weather conditions by virtue of ability of the dust testing facility being able to self-regulate temperature and humidity (as for example 75 degrees Fahrenheit and 50% relative humidity).

Accordingly, it is an object of the present invention to provide a dust testing facility for static dust testing of motor vehicles.

This and additional objects, features and advantages of the present invention will become clearer from the following specification of a preferred embodiment.

BRIEF DESCRIPTION OF THE DRAWINGS

FIG. 4A is a schematic view of a portion of the dust return system of the dust testing facility according to the present invention.

FIG. 4B is a schematic view, seen along line 4B—4B of FIG. 4A.

FIG. 5 is a schematic top plan view of a portion of the dust testing facility according to the present invention.

DESCRIPTION OF THE PREFERRED EMBODIMENT

Figure 1:
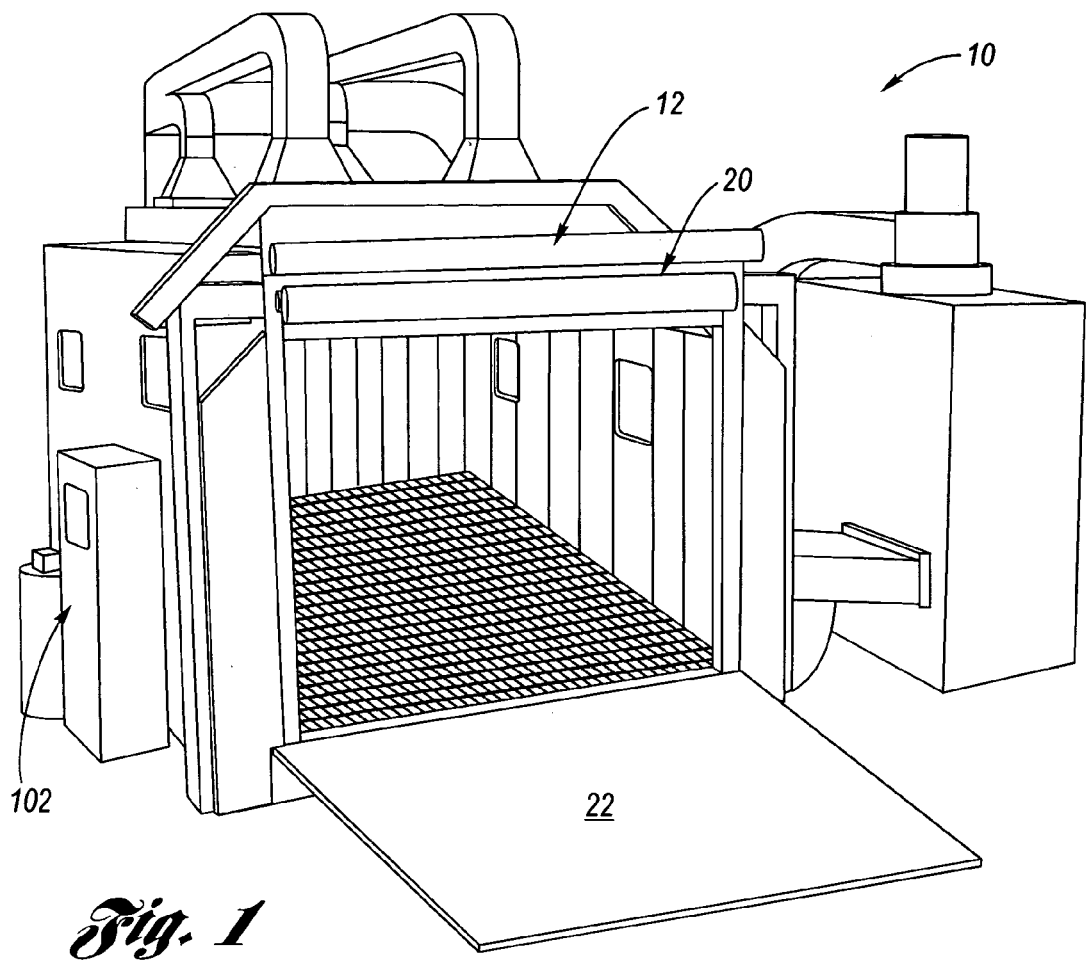
FIG. 1 is a perspective view of a dust testing chamber of a dust testing facility according to the present invention.

Referring now to the Drawings, FIGS. 1 through 7 depict various aspects of a dust testing facility 10 for testing dust affects upon a motor vehicle according to the present invention.

Figure 3:
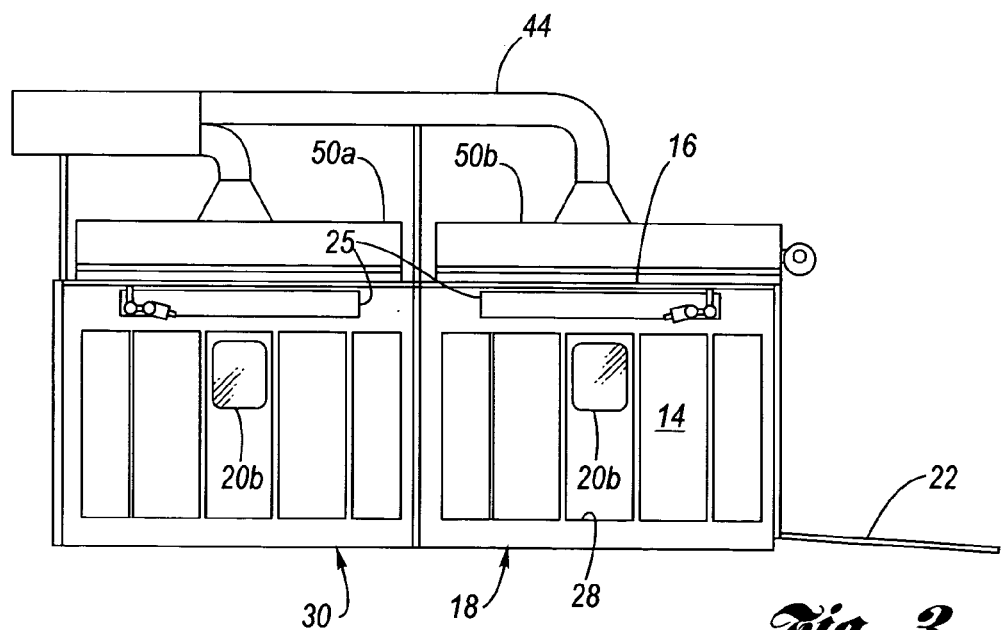
FIG. 3 is a schematic side view of the dust testing chamber according to the present invention.
Figure 2:
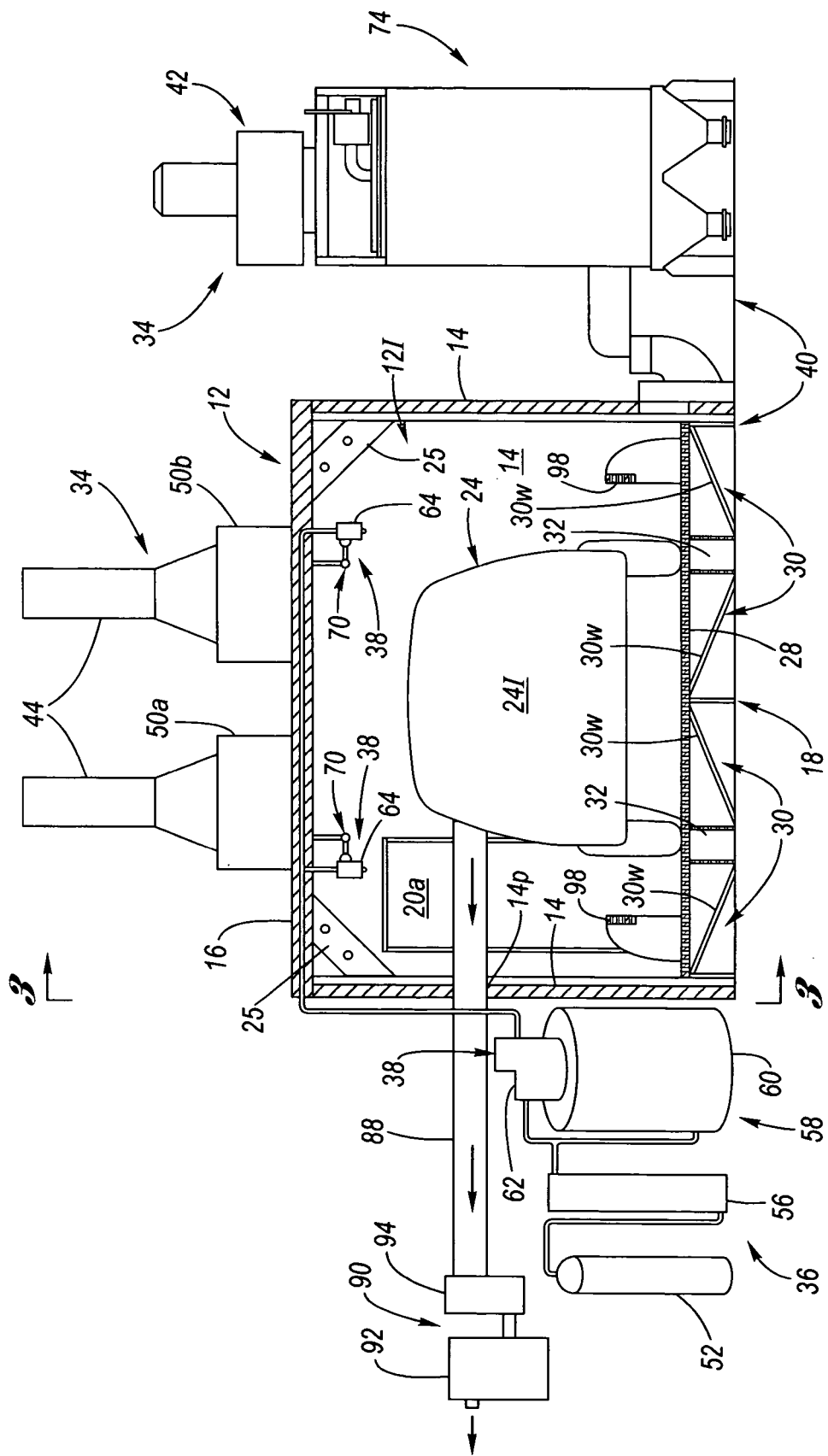
FIG. 2 is a schematic front view of the dust testing facility, wherein the dust testing chamber thereof is seen sectionally.

As can be seen at FIGS. 1 through 3, the dust testing facility 10 includes a dust testing chamber 12 having sidewalls 14 and a ceiling 16, all composed preferably of galvanized aluminum, and a flooring group 18, all of which being in sealing relation with respect to each other, and further including a motor vehicle access door 20, a hinged personnel access door 20a and windows 20b (a pair of windows in each opposing sidewall). The vehicle access door 20 is preferably a roll-up type door, as for example manufactured by Albany Door Systems of Lawrenceville, Ga. For purposes of motor vehicle dust testing, it is preferred for the dimensions of the dust chamber to be about 24 feet long, 12 feet wide and 8 feet high. The flooring group 18 includes a floor grating 28 which is elevated about 1 foot above ground (for dust return purposes to be detailed hereinbelow), so that a ramp 22 is provided for moving a motor vehicle 24 to be dust tested into and out of the dust testing chamber 12. Enclosed lighting 25, preferably of the fluorescent type, is provided in beveled relation to the ceiling-sidewall interface along the length of the dust testing chamber 12.

The dust testing chamber 12 provides an interior chamber space 12I when the doors 20 and 20a are closed, wherein as can be seen at FIG. 2, the motor vehicle 24 to be tested fits entirely therewithin and the wheels thereof rest upon the floor grating 28. In this regard, dust within the dust testing chamber 12 is kept therewithin during operation by maintaining an air pressure within the dust testing chamber below atmospheric pressure, as will be discussed hereinbelow.

A leak detection system 90 is connected with the motor vehicle 24, as for example at the driver's side window, so as to openly communicate with the interior vehicle space 24I of the motor vehicle, the nature of which will be discussed hereinbelow.

The flooring group 18 includes the open metal floor grating 28 supported above a plenum 30 and return ducts 32 which fluidically communicate the plenum along its length. The plenum 30 is in open communication with the grating 28, and has acutely angled plenum walls 30w which extend the length of the dust testing chamber 12. The return ducts 32 am the length of the dust testing chamber 12 at the lowest point of the plenum walls 30w, and, as such, are positioned to optimally extract dust accumulation in the plenum 30, as will be understood from the operational description hereinbelow.

Figure 6:
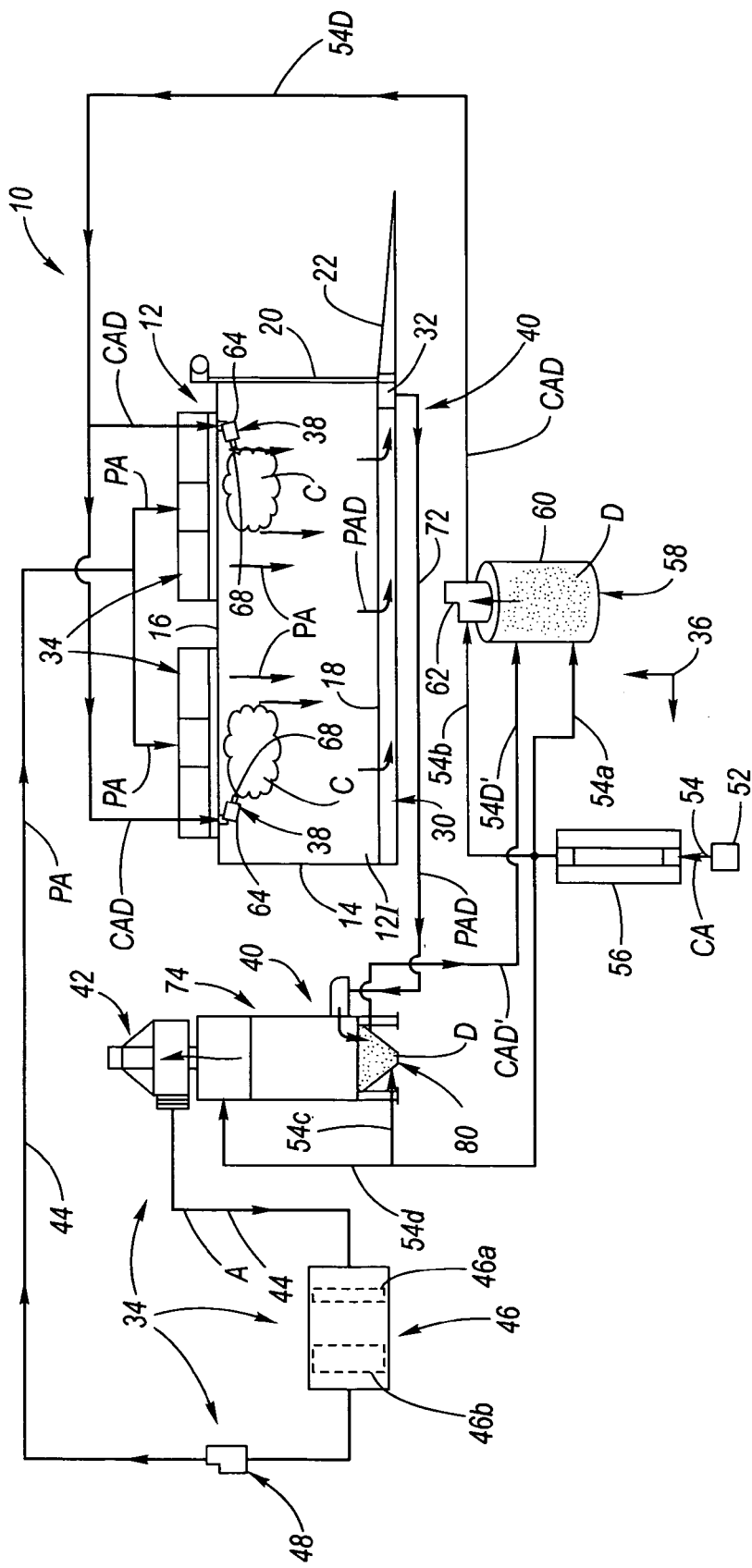
FIG. 6 is a schematic flow chart of the dust testing facility according to the present invention.

As can be understood by additional reference to FIG. 6, connected to the dust testing chamber 12, are an air supply system 34, a dust supply system 36, a dust spray system 38 interfaced with the dust supply system, and a dust recapture system 40 interfaced with the air flow and dust supply systems.

Turning particular attention firstly to the air supply system 34, which is shown schematically at FIG. 5, a fan unit 42, as for example utilizing a 182 class fan of Twin City Co., Minneapolis, Minn., provides a source of flowing air A, having a selected flow rate, as for a preferred example of about 6,000 cubic feet per minute. Upstream of the fan unit 42, a selected majority portion of the flowing air A is recyclably sourced from circulated air that has passed through the dust testing chamber 12, the dust recapture system 40, including an air filtration unit 74 of the dust recapture system, and the rest of the air is sourced from external fresh air, as needed. Downstream of the fan unit 42, the flowing air A is conducted along air supply ducts 44 such that the flowing air passes through a heating and air conditioning unit 46 featuring an air conditioner 46a for cooling and dehumidifying the flowing air and a heater 46b for heating (or reheating after the air conditioner) the flowing air, and a downstream steam injection unit 48 for providing selective increase of humidity to the flowing air, all of which providing processed flowing air PA. In this regard it is preferred for the heating and air conditioning and steam injection units 46, 48 to provide processed flowing air PA having an ambient temperature of 75 degrees Fahrenheit and 50% relative humidity. The air supply ducts 44 then direct this processed flowing air PA to four mutually spaced air vents 50a, 50b, 50c, 50c located at the ceiling of the dust testing chamber 12 and fludicially communicating with the interior thereof. As will be further discussed hereinbelow, selective venting of the air supply ducts 44 and speed of the fan unit 42 are adjusted during operation of the air supply system 34 to provide a negative air pressure in the interior chamber space 12I.

The dust supply system 36 includes a source 52 of compressed air CA having a pressure, for example of about 130 psi, which, via a high pressure air supply conduit 54 supplies the compressed air to an air dryer 56, as for example Model 180HPS10AFJ, manufactured by Zeks Compressed Air Solutions of West Chester, Pa. The compressed air CA is dried, as for example to a dew point of minus 124.4 degrees Fahrenheit. A supply dust fluidizer 58 is composed of a supply dust holding tank (or bed) 60, as for example Model 702PROX manufactured by Nordson Corporation of Westlake, Ohio. Located within the supply dust holding tank 60 is a suitable quantity of dust D, preferably road dust, and most preferably a processed road dust consisting of road dust collected from desert areas Arizona, having a size range of between 0 and 180 microns, the components thereof including free silica, as for example supplied by Powder Technologies, Inc. of Burnsville, Minn., coarse dust part number IS012103-1,A4. A second high pressure air supply conduit 54a from the air dryer 56 goes into the supply dust holding tank 60 and provides fluidization of the dust D, wherein fluidization of powder for dry coating painting is well known in the art and uniquely adapted in the present invention for use to fluidize the road dust D.

The dust supply system 38 includes a pneumatic pump 62, as for example Model 627LS manufactured by Nordson Corporation of Westlake, Ohio, which is connected to a third high pressure air supply conduit 54*b* from the air dryer 56. The pump 62 extracts the fluidized dust D from supply dust holding tank 60 and then provides a pressurized mixture of compressed air and the dust CAD which then is sent along a high pressure dust supply conduit 54D to four mutually spaced dust spray nozzles 64, as for example an Aero-Charge® powder spray gun of Nordson Corporation of Westlake, Ohio. Each spray nozzle 64 is preferably located under a respective air vent 50*a*, 50*b*, 50*c*, 50*d* of the air supply system 34. The dust spray nozzles 64 are each mounted on twin swivel stands 70 which depend from the ceiling 16 and allow for three degrees of freedom of aiming of the dust spray nozzles. Each dust spray nozzle 66 has an exit orifice 68 which is generally oriented longitudinally (generally parallel to the length) of the dust testing chamber 12 such as to provide a cloud C of the dust D in the interior chamber space 12I which expands generally toward the center of the dust testing chamber, the cloud mixing with the processed air PA from the air supply system 34.

The aforementioned dust recapture system 40 provides for recirculation (recycling) of both the processed air PA and the dust D which have been introduced into the dust testing chamber 12 in the manner described hereinabove. As above described, the floor grating 28 is universally perforated so as to allow passage freely therethrough of the processed air and the dust PAD from the interior chamber space 12I into the plenum 30 and exit via the return ducts 32. The negative air pressure to provide this evacuation is supplied by the aforementioned air flow system 34, in particular the fan unit 42, interfaced with the dust recapture system 40, in that the return ducts 32 interface, via return ducting 72 to a return dust fluidizer 78 the air filtration unit 74. In this regard, it is preferred for the air supply system 34 to provide an air pressure within the interior chamber space 12I which is below atmospheric pressure, as for example 0.1 inches of water so that all dust is kept therewithinin. The return dust fluidizer 78 includes a return dust holding tank (or bed) 80 which is interconnected with a fourth high pressure air supply conduit 54*c* goes between the air dryer 56 and the return dust holding tank 80 such that the dust D is fluidized with the compressed air, wherein fluidization of powder for dry coating painting is well known in the art and uniquely adapted in the present invention for use to fluidize the road dust D. The dust D is then extracted from the return dust holding tank in the form of a fluidic mixture of the compressed air and the dust CAD', which is then transported along a second high pressure dust supply conduit 54D' to the supply dust holding tank 60.

In order to provide clean air recyclably to the fan unit 42, the air filtration unit 74 is provided gravitationally above the return dust holding tank 80. In this regard, dust D will accumulate in the return dust holding tank 80 either by directly falling thereinto, falling from the filter system 86 of the filtration unit 74, or upon back pulse pressurization of the filters as discussed hereinbelow. A preferred filter system 86 is composed of 24 box filters, each being a Herding filter No. 1500/18.

To perform dust investigations, a motor vehicle 24 is parked inside the dust testing chamber 12 (within the interior chamber space 12I) and the interior vehicle space 24I of the motor vehicle is then connected, via tubing 88 (for example a flexible 6 inch diameter tube for air evacuation and a one-half inch diameter tube for cabin pressure measurement) to a leak detection system 90, as for example Model FD-TMM-400 of Flow Dynamics Corporation of Mesa, Ariz., through a portal 14*p* formed in a sidewall 14 of the dust testing chamber 12. The leak detection system 90 is, for example, composed of a vacuum generating and leak detecting device 92 preceded upstream by a dust filter 94. In this regard, the motor vehicle 24 is prepared by taping shut its body air inlet and inserting a window template in the driver's side front door window (which is in the down position). Electrostatic precipitators are placed in the rear seat and rear compartment to provide air borne dust measurement within the passenger compartment 24I of the motor vehicle.

To facilitate the dust clouds C enveloping the motor vehicle 24 in a desired manner, a plurality of stand-alone fans 98 are preferably placed around the floor grating 28, for example one stand-alone fan at each wheel well of the motor vehicle.

Figure 7:
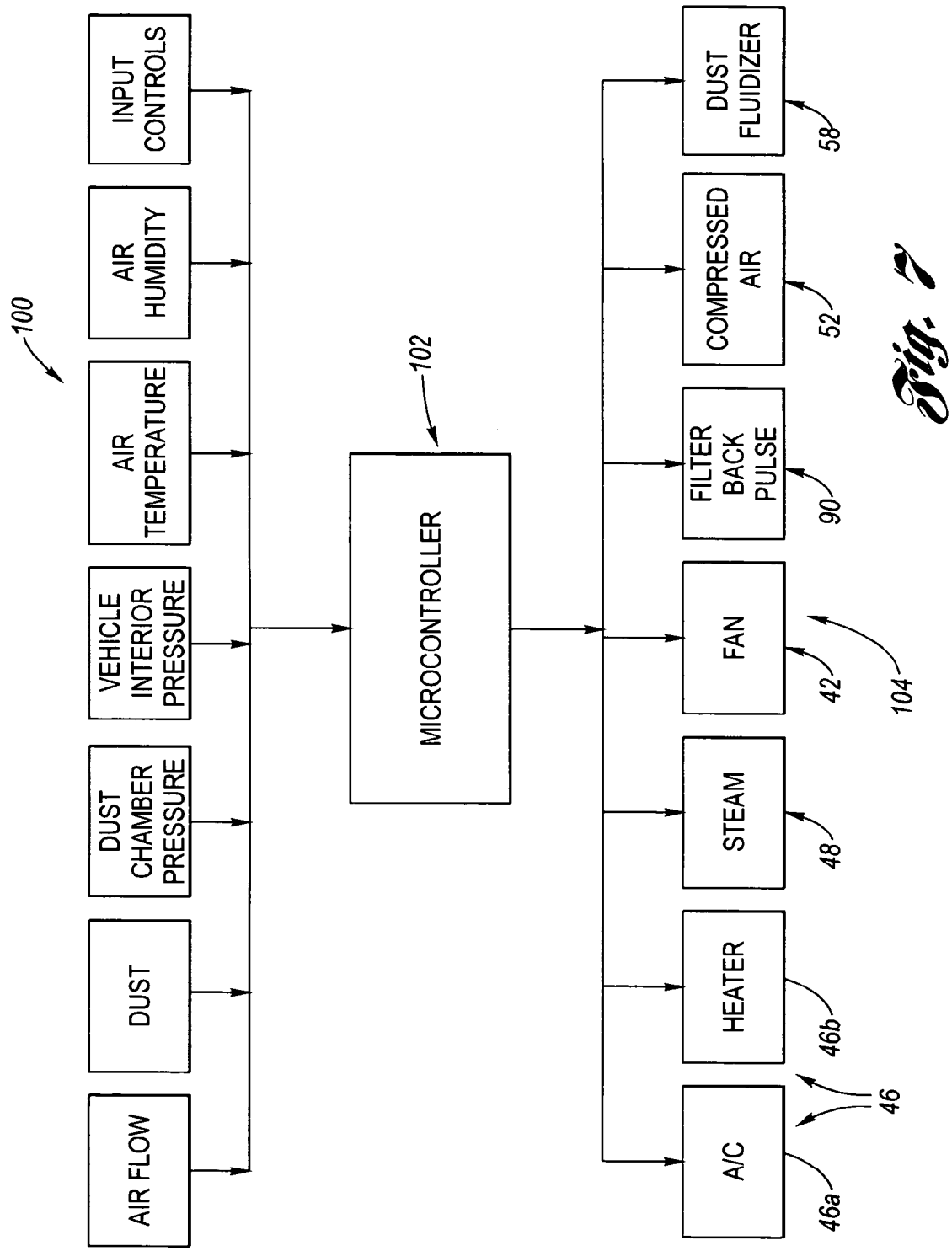
FIG. 7 is a microcontroller schematic diagram for the dust testing facility according to the present invention.

Operation of the dust testing facility 10 will now be described with additional reference to FIG. 7, wherein it is seen that various sensor inputs 100 are processed according to a predetermined program by a microcontroller 102 with manual inputs, as for example a Model PanelView 550 of Allen-Bradley, Division of Rockwell Automation, Milwaukee, Wis., whereupon operation of the above described components 104 of the dust testing facility 10 are controlled. After placement of the motor vehicle into the dust testing chamber 12 and its preparation with the leak detection system 90, as described above, the following sequence of events are typical.

The leak detection system 90 is activated and a waiting period begins in order to ensure the pressure of the interior vehicle space 24I of the motor vehicle is at 0.5 inches of water negative pressure (vacuum) relative to atmospheric pressure (that is, 0.5 inches of water below atmospheric pressure). The stand-alone fans 98 are switched on (manually), the fan unit 42 is switch on and adjusted to provide about 6,000 cubic feet per minute of air flow, and the microprocessor 102 adjusts the air A via the heating and air conditioning and steam injection units 46, 48 so that it becomes processed air PA having 75 degrees Fahrenheit temperature and 50% relative humidity upon entry into the dust test chamber 12. Further, the microprocessor 102 adjusts the air supply system 34 so that there is a 0.1 inch of water of negative (vacuum) pressure relative to atmospheric in the interior chamber space 12I of the dust testing chamber 12. The dust fluidizers 58, 78 are activated. This warm-up phase of the operation typically lasts about 15 minutes.

The pump 62 is then activated, whereupon the dust D is emitted from the dust spray nozzles 64 in the form of dust clouds C. This continues for a preferred eight minutes, which is the test phase of operation.

At the conclusion of the test phase, the pump 62 is deactivated, stand-alone fans are turned off, the leak detection system 90 is turned off, and the dust fluidizers are deactivated; dust entry into the dust testing chamber 12 has now ceased. The fan unit 42 continues running for another twelve minutes, which is the cleaning phase of operation, to provide evacuation of the dust from the dust testing chamber 12.

At the end of the cleaning phase, the dust evaluation phase commences. With the fan unit still running, the hinged personnel access door 20*a* is opened and the leak detection system 90 disconnected from the motor vehicle, and the electrostatic precipitators are removed from the interior vehicle space of the motor vehicle 24 and then weighed to ascertain the amount of dust collected thereinside during the test phase. The exterior of the motor vehicle is cleaned of dust while still in the dust testing chamber 12 and the fan unit is still running. The fan unit is now shut down and the roll-up door is opened, the vehicle is removed from the dust testing chamber 12 and visually inspected for all locations of dust entry, as for example around the door seals.

In order to recapture as much of the dust as possible for recirculation, the microprocessor selectively uses a fifth high pressure air conduit 54c during the cleaning phase of operation to supply pulsating back pressure to the filter system 86, the air pulsations causing the box filters of the filtration unit to flutter and thereby purge dust clinging to the filter system to the return dust holding tank 80.

As can be understood from the foregoing, the dust testing facility according to the present invention has the advantage of providing motor vehicle dust testing to be conducted year round and independent of external weather conditions by virtue of the dust test chamber's ability to self-regulate temperature and humidity.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A dust testing facility for testing environmental dust affects upon a motor vehicle, comprising:

a dust testing chamber having an interior chamber space structured to receive therewithin a motor vehicle, said dust testing chamber comprising a ceiling, an oppositely disposed flooring group and a plurality of sidewalls disposed between said ceiling and said flooring group, said ceiling, flooring group and sidewalls collectively defining said interior chamber space; said flooring group comprising a floor grating; a plenum below said floor grating; and a plurality of return ducts interfaced with said plenum and fluidically communicating with said interior chamber space through said floor grating;

an air supply system configured to supply flowing air to said dust testing chamber;

a dust supply system configured to provide a mixture of fluidized dust and compressed air;

a dust spray system mounted within said dust testing chamber and connected to said dust supply system, said dust spray system being configured to provide clouding of the dust within said interior chamber space in response to receiving the mixture of fluidized dust and compressed air from said dust spray system; and a dust recapture system connected between said flooring group and said air supply system and further connected with said dust supply system, said dust recapture system comprising:

an air filtration unit structured to filter air and the dust from said flooring group and allow the flowing air to recyclably pass into said air supply system; and a return dust fluidizer structured to fluidize the dust from said plenum and return the dust to said dust supply system.

2. The facility of claim 1, wherein said plenum comprises a plurality of acutely angled plenum walls defining a set of gravitational low points running along a length of said dust testing chamber; wherein each return duct of said plurality of return ducts is located, respectively, at each point in said set, and wherein said plurality of return ducts communicate with said air filtration unit.

3. The facility of claim 2, wherein said dust comprises road dust having a size range between substantially zero and 180 microns.

4. The facility of claim 2, wherein said air supply system comprises:

a fan unit fluidically communicating with said air filtration unit in upstream relation therewith; and temperature and humidity regulation components connected with said fan unit in downstream relation therewith, said temperature and humidity regulation components imparting the flowing air with predetermined values of relative humidity and temperature;

wherein said air supply system is selectively adjustable to provide an air pressure of said interior chamber space which is below atmospheric pressure.

5. The facility of claim 4, wherein said air flow system further comprises a plurality of vents mounted to said ceiling; and wherein dust spray system comprises a plurality of dust spray nozzles located adjacent said ceiling.

6. The facility of claim 5, further comprising a source of back air pressure connected to said air filtration unit which is selectively activated to purge said filtration unit of dust and thereby locate the purged dust in said return dust fluidizer.

7. The facility of claim 6, further comprising a leak detection device connecting into said interior chamber space through a portal formed in a selected said sidewall.

8. A dust testing facility for testing environmental road dust affects upon a motor vehicle, comprising:

a dust testing chamber having an interior chamber space structured to receive therewithin a motor vehicle, said dust testing chamber comprising a ceiling, an oppositely disposed flooring group and a plurality of sidewalls disposed between said ceiling and said flooring group, said ceiling, flooring group and sidewalls collectively defining said interior chamber space;

an air supply system configured to supply flowing air to said dust testing chamber;

road dust having a size range between substantially zero and 180 microns;

a dust supply system configured to fluidize said road dust and provide a mixture of fluidized road dust and compressed air;

a dust spray system mounted within said dust testing chamber and connected to said dust supply system, said dust spray system being configured to provide clouding of said road dust within said interior chamber space in response to receiving the mixture of the fluidized road dust and compressed air from said dust spray system; and a dust recapture system connected between said flooring group and said air supply system, wherein the road dust sprayed into said dust testing chamber by said dust spray system is returned to said dust supply system, and wherein the flowing air introduced into said dust testing chamber is recycled to said air supply system.

9. The facility of claim 8, wherein:

said flooring group comprises: a floor grating; a plenum below said floor grating; and a plurality of return ducts interfaced with said plenum and fluidically communicating with said interior chamber space through said floor grating; and said dust recapture system comprises:

an air filtration unit structured to filter air and said road dust from said flooring group and allow the flowing air to recyclably pass into said air supply system; and a return dust fluidizer structured to fluidize said road dust from said plenum and return said road dust to said dust supply system.

10. The facility of claim 9, wherein said plenum comprises a plurality of acutely angled plenum walls defining a set of gravitational low points running along a length of said dust testing chamber; wherein each return duct of said plurality of return ducts is located, respectively, at each point of said set, and wherein said plurality of return ducts communicate with said air filtration unit.

11. The facility of claim 10, wherein said air supply system comprises:
   a fan unit fluidically communicating with said air filtration unit in upstream relation therewith; and
   temperature and humidity regulation components connected with said fan unit in downstream relation therewith, said temperature and humidity regulation components imparting the flowing air with predetermined values of relative humidity and temperature;
   wherein said air supply system is selectively adjustable to provide an air pressure of said interior chamber space which is below atmospheric pressure.

12. The facility of claim 11, wherein said air flow system further comprises a plurality of vents mounted to said ceiling; and wherein dust spray system comprises a plurality of dust spray nozzles mounted to said ceiling.

13. The facility of claim 12, further comprising a source of back air pressure connected to said air filtration unit which is selectively activated to purge said filtration unit of said road dust and thereby locate the purged road dust in said return dust fluidizer.

14. The facility of claim 13, further comprising a leak detection device connecting into said interior chamber space through a portal formed in a selected said sidewall.

* * * * *